(12) United States Patent
Garcia et al.

(10) Patent No.: US 11,246,159 B2
(45) Date of Patent: Feb. 8, 2022

(54) TRANSMISSION MEDIUM SHARING IN A WIRELESS COMMUNICATIONS NETWORK

(71) Applicant: JRD Communication (SHENZHEN) LTD., Guangdong (CN)

(72) Inventors: Virgile Garcia, Nanterre (FR); Umer Salim, Nanterre (FR); Mohamed-Achraf Khsiba, Nanterre (FR); Bruno Jechoux, Nanterre (FR)

(73) Assignee: JRD COMMUNICATION (SHENZHEN) LTD., Shenzhen Guangdong (CN)

( * ) Notice: Subject to any disclaimer, the term of this patent is extended or adjusted under 35 U.S.C. 154(b) by 0 days.

(21) Appl. No.: 16/770,015

(22) PCT Filed: Sep. 24, 2019

(86) PCT No.: PCT/CN2019/107481
§ 371 (c)(1),
(2) Date: Jun. 4, 2020

(87) PCT Pub. No.: WO2020/063577
PCT Pub. Date: Apr. 2, 2020

(65) Prior Publication Data
US 2021/0243799 A1    Aug. 5, 2021

(30) Foreign Application Priority Data
Sep. 26, 2018  (GB) ...................................... 1815668

(51) Int. Cl.
*H04W 74/00* (2009.01)
*H04W 76/11* (2018.01)
(Continued)

(52) U.S. Cl.
CPC ......... *H04W 74/008* (2013.01); *H04W 72/14* (2013.01); *H04W 74/0816* (2013.01); *H04W 76/11* (2018.02)

(58) Field of Classification Search
CPC ... H04W 74/008; H04W 76/11; H04W 72/14; H04W 74/0816
See application file for complete search history.

(56) References Cited

U.S. PATENT DOCUMENTS 10,536,972 B2 *  1/2020  Kim ................... H04W 74/006
2016/0227425 A1   8/2016  Kim et al.
(Continued)

FOREIGN PATENT DOCUMENTS

EP    3 609 277 A1     2/2020
GB    2 550 200 A      11/2017
(Continued)

OTHER PUBLICATIONS

Huawei et al., "NR frame structure and scheduling on unlicensed bands", 3GPP TSG RAN WGJ Meeting #92bis, R1-1803678, Apr. 20, 2018.
(Continued)

*Primary Examiner* — Kashif Siddiqui
(74) *Attorney, Agent, or Firm* — BakerHostetler

(57) ABSTRACT

A method of enabling sharing of a transmission medium by a first node of a wireless communications network and at least one further node of the network, comprising at the first node, acquiring occupancy of a channel of the transmission medium for a chosen Channel Occupancy Time which is less than or equal to a Maximum Channel Occupancy Time, generating first medium information comprising first node identification data, generating second medium sharing information comprising first node channel occupancy expiration time data, transmitting the first medium sharing information,
(Continued)

transmitting the second medium sharing information, at the further node, receiving the first medium sharing information, using the information to identify the first node and using the identification of the first node to determine when sharing of the channel with the first node is allowed, receiving the second medium sharing information, using the information to determine the expiration time of the occupancy of the channel by the first node and using the expiration time to determine when transmission on the channel by the further node is possible.

6 Claims, 3 Drawing Sheets

(51) Int. Cl.
*H04W 72/14* (2009.01)
*H04W 74/08* (2009.01)

(56) References Cited

U.S. PATENT DOCUMENTS

| | | |
|---|---|---|
| 2017/0041805 A1 | 2/2017 | Chandrasekhar et al. |
| 2017/0238342 A1* | 8/2017 | Yang .................. H04W 72/087 370/329 |
| 2018/0027582 A1 | 1/2018 | Yerramalli et al. |
| 2018/0227936 A1* | 8/2018 | Yerramalli .......... H04L 27/2662 |
| 2019/0053274 A1* | 2/2019 | Kim ...................... H04W 48/16 |
| 2019/0342911 A1* | 11/2019 | Talarico ................ H04W 76/27 |
| 2020/0008229 A1* | 1/2020 | Li ........................ H04L 5/0064 |
| 2020/0092913 A1* | 3/2020 | Xu ........................ H04W 48/16 |
| 2020/0228250 A1* | 7/2020 | Cheng .................. H04L 1/1819 |

FOREIGN PATENT DOCUMENTS

| | | |
|---|---|---|
| WO | 2017/126935 A1 | 7/2017 |
| WO | 2017/140249 A1 | 8/2017 |
| WO | 2018/017354 A2 | 1/2018 |

OTHER PUBLICATIONS

Ericsson, "Status Report to TSG", 3GPP TSG RAN meeting #72, RP-160876, Jun. 16, 2016.
Ericsson, "Status Report to TSG", 3GPP TSG RAN meeting #72, RP-161250, Jun. 16, 2016.
TCL Communication, "Discussion on Frequency Reuse for NR-U", 3GPP TSG RAN WG1 Meeting #94, R1-1808258, Aug. 20, 2018.
Qualcomm Incorporated, "Channel Access for Autonomous UL Access", 3GPP TSG RAN WG1 #91, R1-1720406, Nov. 27, 2017.

* cited by examiner

TRANSMISSION MEDIUM SHARING IN A WIRELESS COMMUNICATIONS NETWORK

CROSS-REFERENCE TO RELATED APPLICATIONS

This application is a National Stage of International patent application PCT/CN2019/107481, filed on Sep. 24, 2019, which claims priority to foreign Great Britain patent application No. GB 1815668.7, filed on Sep. 26, 2018, the disclosures of which are incorporated by reference in their entirety.

TECHNICAL FIELD

The following disclosure relates to sharing of a transmission medium in a wireless communication network.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an evolved NodeB (eNodeB or eNB). More recently, LTE is evolving further towards the so-called 5G or NR (new radio) systems where one or more cells are supported by a base station known as a Next Generation Node B (gNB). NR is proposed to utilise an Orthogonal Frequency Division Multiplexed (OFDM) physical transmission format.

The NR protocols are intended to offer options for operating in unlicensed radio bands, to be known as New Radio-Unlicensed (NR-U). When operating in an unlicensed radio band the nodes of the network, the gNB and UE, must compete for physical medium/resource access. For example, Wi-Fi, NR-U and LAA may utilise the same physical resources.

In order to share a transmission medium a Listen Before Talk (LBT) protocol is proposed in which a network node, such as a base station, e.g. a gNB, or a UE, monitors the available medium and only commences a transmission if there is no conflict with another node already utilising the medium. Once an LBT process is successful (the resources are "won"), the gNB or UE node gains access to the medium for up to the Maximum Channel Occupancy Time (MCOT) allowed by the standard used, provided there is no interruption of transmissions for more than a pre-defined interval (for example 16 µs).

In the LBT process, the nodes are required to apply a clear channel assessment (CCA) check prior to transmission. CCA involves at least energy detection (ED) over a time duration with a certain threshold (ED threshold) to determine if a channel of a transmission medium is occupied or is clear. If the channel is occupied, random back-off within a Contention Window Size (CWS) is applied, so that there is a minimum time duration where the channel is clear before the transmitter of the node can transmit. Thus there is typically only one node that is transmitting data in a given area around the node on a given channel. This prevents interference between nodes and ensures fairness of medium utilization.

After the transmitter of the node has gained access to the channel, the node is only allowed by regulation to transmit for up to a limited duration, the MCOT, and may choose to use a COT which is equal to or only part of the duration of the MCOT for one or more transmissions. To provide differentiation to channel access priorities based on the type of traffic served (e.g. VoIP, video, best effort, or background), four LBT priority classes are defined with different CWS and MCOT.

In LAA, LBT is adopted as the fundamental coexistence mechanism.

In Wifi® and WiMax®, a mechanism called Network Allocation Vector (NAV) exists, where a "duration" field is sent in the MAC header at the beginning of the transmitted frame. This duration indicates the duration of the ongoing transmission or of the Transmission Opportunity (TxOP) i.e. reserved transmission time. Nodes which are sensing the medium can read this field. However, the NAV mechanism is intended to reduce the need for a node to listen to the medium, hence reducing power consumption in Wifi®/Wimax®, it is not intended for the purpose of configuring medium sharing. As the NAV information is carried in the preamble or MAC header, it is only transmitted once at the beginning of the frame.

In 3GPP, the transmission of a Channel Usage Indicator (CUI) includes the NAV information and proposes an additional field for UL/DL information. The focus is the protection of receivers of nodes from interference and the CUI is only performed as a one-time preamble kind of transmission.

The above transmission medium sharing approaches seem to make sense for individual devices or small groups which may be operating without any coordination. On the other hand, wireless communications networks are strongly coordinated networks, they have well-defined rules of simultaneous operation and techniques have been adopted to make the simultaneous operation feasible. With this in mind, the classic unlicensed operation approach to transmission medium sharing is quite inefficient for wireless networks, as the usage of the spectrum is very limited.

A possible solution is to involve a centralization of the network e.g. one node controlling and scheduling all sharing nodes or to let the node inform the other nodes of it's COT through dedicated channels (e.g. X2 for sharing between gNBs). But these solutions imply complex and very time sensitive cooperation and in particular delays due to go and back requests/reply mechanisms. Any delay strongly reduces the sharing efficiency as the max MCOT is only 8-10 ms long.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method is provided of enabling sharing of a transmission medium by a first node of a wireless communications network and at least one further node of the network, comprising at the first node, acquiring occupancy of a channel of the transmission medium for a chosen Channel Occupancy Time which is less than or equal to a Maximum Channel Occupancy Time, generating first medium sharing information comprising first node identification data, generating second medium sharing information comprising first node channel occupancy expiration time data, transmitting the first medium sharing information, transmitting the second medium sharing information, at the further node, receiving the first medium sharing information, using the information to identify the first node and using the identification of the first node to determine when sharing of the channel with the first node is allowed, receiving the second medium sharing information, using the information to determine the expiration time of the occupancy of the channel by the first node and using the expiration time to determine when transmission on the channel by the further node is possible.

The method enables spatial reuse or medium sharing by a first node which is already transmitting on the medium and a further node that desires to transmit i.e. is listening to the medium for an opportunity to transmit. This enables and improves the feasibility of sharing a transmission medium, such as an unlicensed spectrum, by a first node with another node, i.e. enables multiplexing.

The first node identification data may comprise a cell ID. The first node identification data may comprise a Radio Network Temporary Identifier (RNTI). The first node identification data may comprise an operator ID of the node. The first node identification data may comprise a group of node ID. The first node identification data may comprise a COT identification. The overhead of the first node identification data is preferably small.

The first node channel occupancy expiration time data may comprise a priority class of the first node transmission. The priority class may be used to obtain an MCOT and the MCOT and a time of transmission of the data used to determine the expiration time. The priority class may comprise one of four possible classes. The priority class overhead may then comprise 2 bits. The time of transmission of the data may be a pre-defined time. The time of transmission of the data may be detected by the further node.

The first node channel occupancy expiration time data may comprise a remaining duration of the chosen COT. The remaining duration of the chosen COT may be expressed as an integer of remaining millisecond duration. This may be encoded as 3 bits or 4 bits.

The first node channel occupancy expiration time data may comprise an absolute expiration time. The absolute expiration time may be defined using an absolute reference. The format of the absolute expiration time may be reduced using a modulo of the absolute time.

The first node channel occupancy expiration time data allows the further node to determine until when the further node may transmit on the shared channel. This avoids violation of fair utilization of the channel. Without the first node channel occupancy expiration time data, a further node that wants to use the channel does not know how long the channel is available.

The first medium sharing information and the second medium sharing information may be transmitted together.

The first medium sharing information may be transmitted according to a transmission timing rule. The second medium sharing information may be transmitted according to a transmission timing rule.

The transmission timing rule may comprise transmission of the sharing information once at commencement of a transmission by the first node, which may be a first or subsequent transmission by the first node. The transmission timing rule may comprise transmission of the sharing information once at a pre-defined delay from commencement of a transmission by the first node, which may be a first or subsequent transmission by the first node. These transmission rules are particularly useful for a further node accessing the channel for a first time within the transmission of the first node.

The transmission timing rule may comprise continuous transmission of the sharing information. The continuous transmission of the sharing information may use a frequency subset of frequencies used by the channel.

The transmission timing rule may comprise multiple transmissions of the sharing information during at least one transmission of the first node, which may be a first or subsequent transmission by the first node.

The multiple transmissions of the sharing information may be periodically spaced over the at least one transmission of the first node. The multiple transmissions of the sharing information may be periodically spaced every 1 ms over the at least one transmission of the first node. The periodically spaced transmission of the sharing information can make it easier for the further nodes, UE or base station, to detect the sharing information. The periodically spaced transmission of the sharing information may be aligned with NR timing of sub-frames and can be used to contain the overhead by transmitting the sharing information periodically after an integer number of sub-frames.

The multiple transmissions of the sharing information may be irregularly spaced over the at least one transmission of the first node. The multiple transmissions of the sharing information may be irregularly spaced over the at least one transmission of the first node by having more transmissions of the sharing information at commencement of a transmission of the first node and less transmissions of the sharing information towards an end of a transmission of the first node. This facilitates a situation when the transmission of the first node is close to expiration (e.g. at least after the time corresponding to "COT expiration—further node transmission preparation time", transmission of the sharing information can be stopped as it is not needed anymore.

The transmission timing rule may be a function of density of traffic of the first node and the further node. When the traffic density is high (e.g. measured with contention reports or through higher layer feedback) more transmissions of the sharing information can be made to increase use of the channel by the further node. When the traffic density is low, the transmissions can be decreased.

When the transmission timing rule comprises multiple transmissions of the sharing information during at least one transmission of the first node, the same sharing information may be repeated in each transmission thereof. This will enable soft-decoding of the sharing information at the further node.

When the transmission timing rule comprises multiple transmissions of the sharing information during at least one transmission of the first node, the sharing information may be updated from transmission to transmission thereof. The sharing information may be updated when the first node uses a chosen COT which is less than the full MCOT.

When the transmission timing rule comprises multiple transmissions of the sharing information during at least one transmission of the first node, the sharing information may be changed from transmission to transmission thereof. For example, an initial sharing information transmission may comprise a priority class value while further sharing information transmissions may comprise an absolute expiration time.

The sharing information may be transmitted by the first node using a dedicated broadcast-like signal. The sharing information may be transmitted by the first node using specific transmission patterns, for example blanking based patterns. The sharing information may be transmitted by the first node using any of a preamble signal, a wake-up signal, a MAC-like header, a reference signal, a control channel signal.

Multiple transmissions of the sharing information during at least one transmission of the first node offers more occasions for successful detection of the sharing information by the further node and hence increases opportunities of channel sharing. This also deals with the situation of missed sharing information where the LBT of the further node is not at the same time as the transmission of the sharing information by the first node.

Using the identification of the first node to determine when sharing of the channel with the first node is allowed may comprise determining that the first node technology is the same as the further node technology. Using the identification of the first node to determine when sharing of the channel with the first node is allowed may comprise determining that the first node operator is the same as the further node operator.

Using the expiration time of the transmission of the first node to determine when transmission on the channel by the further node is possible may comprise determining if an expiration time of a proposed transmission of the further node precedes the expiration time of the transmission of the first node.

The transmission medium used in the method may be an unlicensed transmission medium.

The first node may be a base station and the at least one further node may be a neighbouring base station. The base stations may be gNB or eNB. The first node may be a first UE and the at least one further node may be a further UE. The first UE and the further UE may be in the same cell, or in the same sector, or in the same comp cell or in any grouping of users or have the same operator. The first node may be a UE and the at least one further node may be a base station, such as a gNB. The first node may be a base station, such as a gNB and the at least one further node may be a UE.

The UEs may use the method in UL transmissions. The UEs may use the method in autonomous UL (AUL) transmissions where UL transmissions are allowed without requiring a prior scheduling request. The method may be used when the first node is a first UE supporting V2X applications and the at least one further node is a further UE supporting V2X applications or when the first node is a vehicular UE supporting V2X applications and the at least one further node is a Road Side Unit (RSU) implemented in a stationary UE or an eNodeB.

Any node transmitting using the chosen COT may transmit the sharing information to a further node.

The wireless communications network may be a NR-U network, or for example LTE LAA (and LAA evolutions). The wireless communications network may be a LTE network running a V2X application. The wireless communications network may be a NR network running a V2X application. The wireless communications network may be a WiFi® network. The wireless communications network may be a WiMAX® network.

The method for enabling medium sharing allows channel frequency reuse among neighbouring base stations of the same operator. As these base stations are in general transmitting over the same medium, they are fully capable of handling interference and co-existence scenarios. The method enables a further node to transmit instead of waiting a full MCOT of the first node; this can technically gain 8-10 ms of maximum throughput over the shared channel.

A base station is provided configured to perform the method of the first aspect of the invention. A UE is provided configured to perform the method of the first aspect of the invention.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
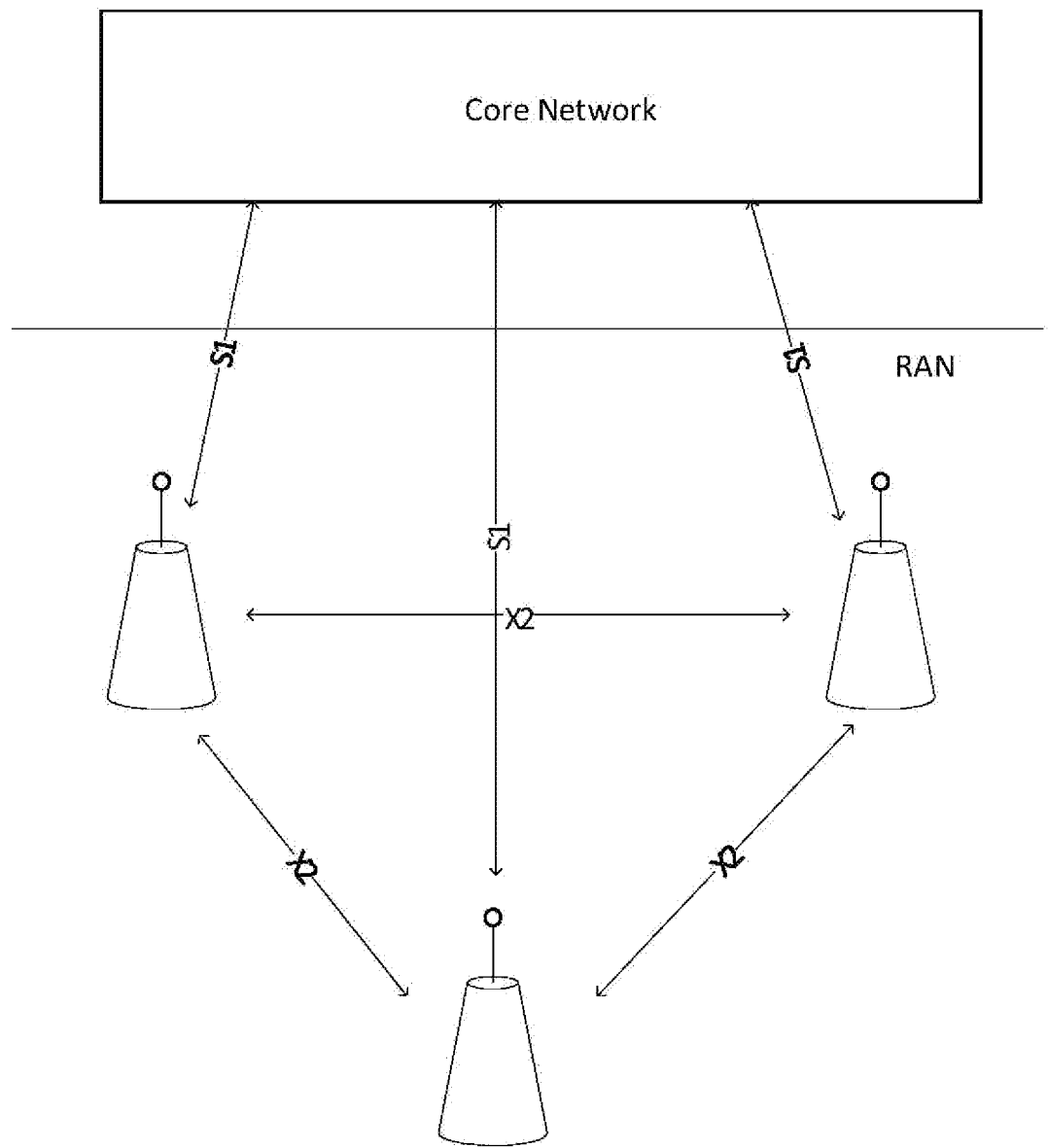
FIG. 1 shows a schematic diagram of a wireless communications network using the method of the invention.

FIG. 1 shows a schematic diagram of three nodes in the form of base stations (for example, eNB or gNBs depending on the particular cellular standard and terminology) forming a cellular wireless communications network. In this embodiment, the wireless communications network is a NR-U network, using unlicensed transmission medium. It will be appreciated that the invention may be employed in other types of networks, using licensed transmission medium. Each of the base stations, or two or more of the base stations, may be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network.

The base stations each comprise hardware and software to implement the RAN's functionality, including communications with the core network and other base stations, carriage of control and data signals between the core network and UEs and maintaining wireless communications with UEs associated with each base station. The core network comprises hardware and software to implement the network functionality, such as overall network management and control, and routing of calls and data.

The invention provides a method of enabling sharing of a transmission medium by a first node of the wireless communications network of FIG. 1 and at least one further node of the network. In this embodiment, the first node and the further node are neighbouring base stations of the network and the method is used in the DL transmissions of the base stations. The base stations may be gNB.

It will be appreciated, however, that the method may be used when the first node is a first UE and the at least one further node is a further UE. The first UE and the further UE may be in the same cell, or in the same sector, or in the same comp cell, or in any grouping of users or have the same operator. The method may be used when the first node is a UE and the at least one further node is a base station, such as a gNB, or when the first node is a base station, such as a gNB and the at least one further node is a UE. The UEs may use the method in UL transmissions. The UEs may use the method in autonomous UL (AUL) transmissions using configured grants. The method may be used when the first node is a first UE supporting V2X applications and the at least one further node is a further UE supporting V2X applications or when the first node is a vehicular UE supporting V2X applications and the at least one further node is a Road Side Unit (RSU) implemented in a stationary UE or a base station.

Figure 2:
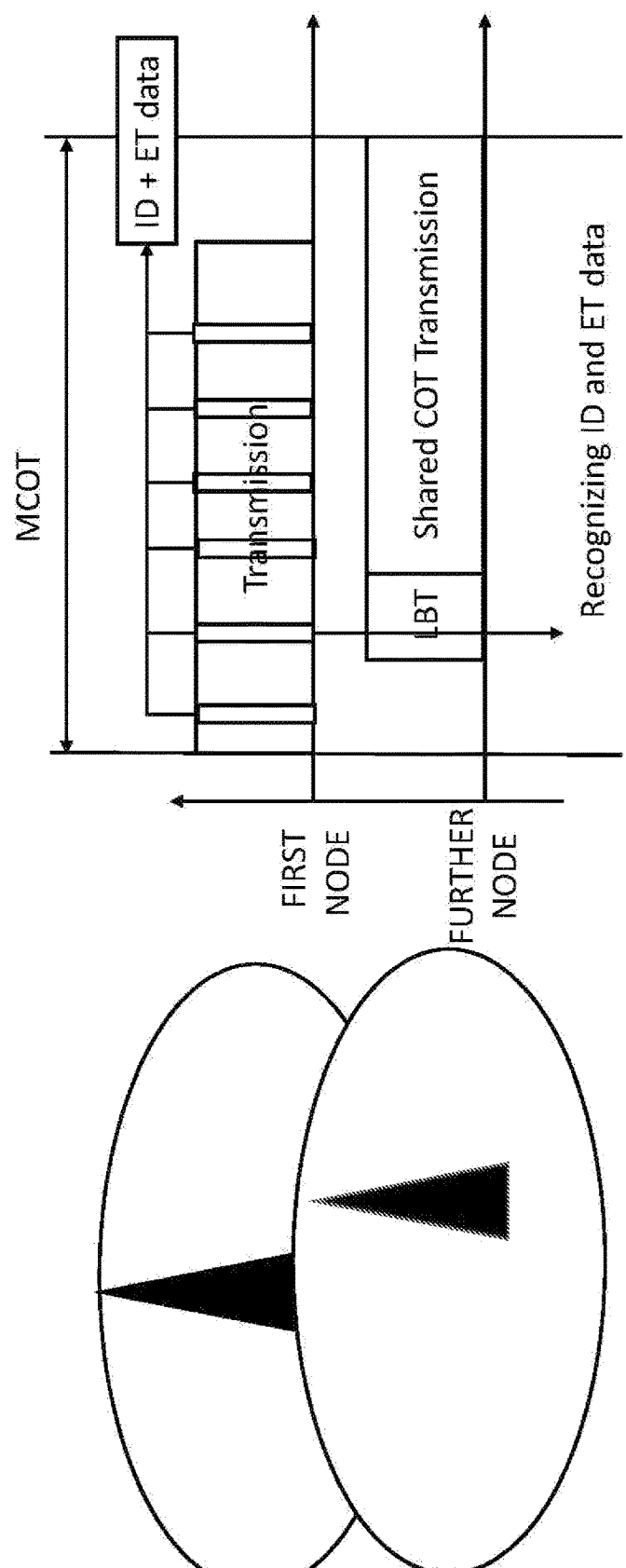
FIG. 2 shows a schematic diagram of a first node and a further node of the network of FIG. 1 sharing a transmission medium.

Referring to FIG. 2, the first node gains access to a channel of the unlicensed transmission medium in a manner known in the art and starts a transmission on the channel. The channel occupancy for the first node has a MCOT set by regulation, as shown, and has a chosen COT in which the first node will send one or more transmissions. The COT may be less than or equal to the MCOT. The first node generates first medium sharing information comprising first node identification data, and generates second medium sharing information comprising first node channel occupancy expiration time data.

In this embodiment, the first node identification data comprises an operator ID of the node, but it will be appreciated that other identification data can be used. In this embodiment, the first node channel occupancy expiration time data comprises an absolute expiration time, defined using an absolute reference and in the format of a modulo of the absolute time. It will be appreciated that other first node channel occupancy expiration time data which tells the further node how long the channel is available may be used. This may comprise a priority class of the first node transmission or a remaining duration of the chosen COT of the first node.

The first node then transmits the first medium sharing information and transmits the second medium sharing information on the channel of the transmission medium during a transmission of the first node, as shown. In this embodiment, the first medium sharing information and the second medium sharing information are transmitted together, according to a transmission timing rule. Here, the transmission timing rule comprises multiple transmissions of the sharing information periodically spaced over the transmission of the first node, as shown. The multiple transmissions of the sharing information may be periodically spaced every 1 ms over the transmission of the first node.

It will be appreciated that other transmission timing rules may be used, such as multiple transmissions of the sharing information irregularly spaced over the transmission of the first node, transmission of the sharing information once at commencement of the transmission by the first node, transmission of the sharing information once at a pre-defined delay from commencement of the transmission by the first node, continuous transmission of the sharing information. The chosen transmission timing rule may be a function of density of traffic of the first node and the further node.

As, in this embodiment, the first node channel occupancy expiration time data comprises an absolute expiration time, the sharing information comprising the absolute expiration time will be the same from transmission to transmission of the sharing information by the first node. The sharing information is transmitted by the first node on the channel of the transmission medium using a dedicated broadcast-like signal. Specific transmission patterns may be used by the first node to transmit the sharing information. The broadcast-like signal of the first node will be received by the further node.

Figure 3:
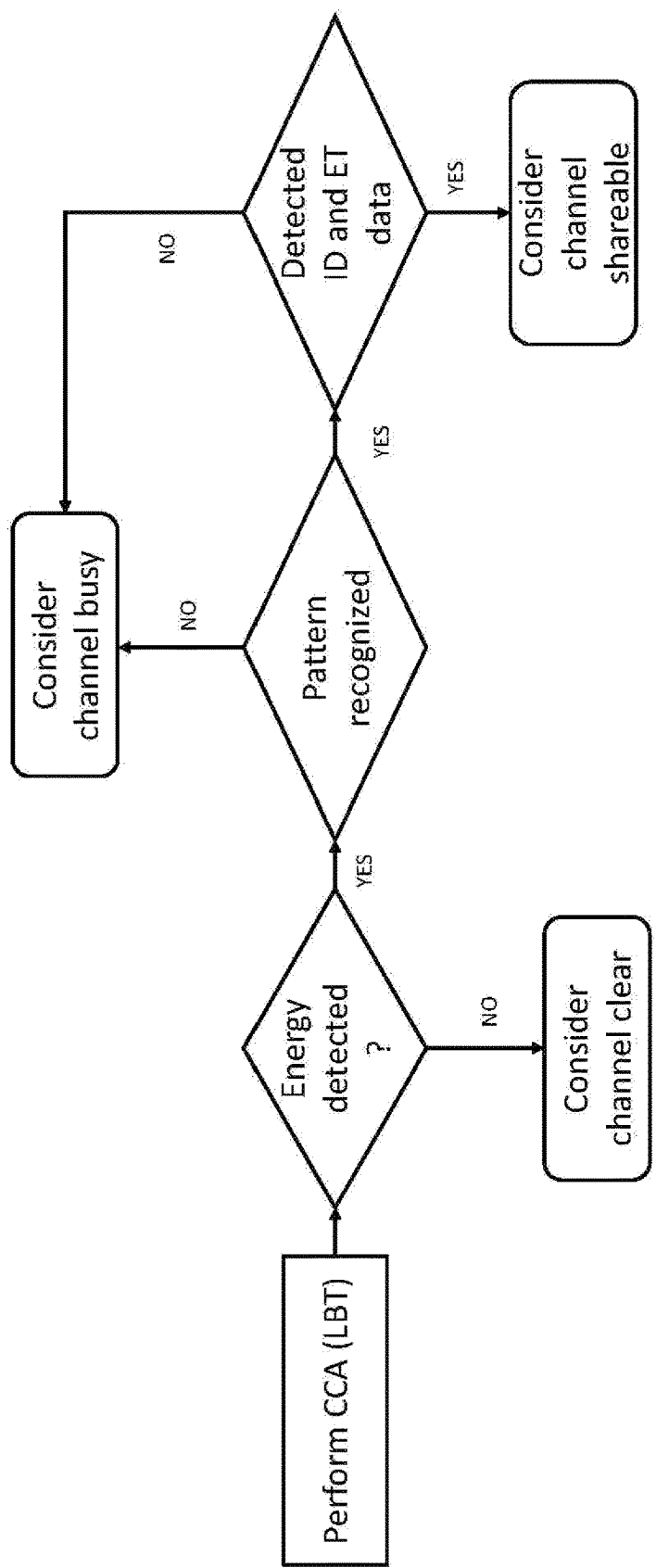
FIG. 3 shows a schematic diagram of the further node of FIG. 2 using a LBT process.

Referring to FIG. 3, when the further node desires to transmit on the channel of the transmission medium, it initiates the CCA procedure of the LBT process. This usually involves performing Energy Detection (ED) that senses for signal presence. If no signal energy is detected beyond the ED threshold, the channel is considered to be clear. When energy is detected, instead of starting a back-off and delaying the transmission, the further node attempts to recognize the pattern of the signal received by the further node during the LBT process. If the pattern is not present or is not decoded correctly as the pattern is too weak, the channel is considered to be busy which starts a back-off and delaying of the transmission. If the pattern of the received signal is recognized, the further node attempts to detect sharing information (first node ID and expiration time data) in the signal of the first node. If the sharing information is not present or is not detected correctly, the channel is considered to be busy which starts a back-off and delaying of the further node transmission. If the sharing information is detected, it is used to decide if the further node can share use of the channel with the first node.

The sharing information detected by the further node in the LBT process comprises both the first medium sharing information comprising the first node identification data and the second medium sharing information comprising the first node channel occupancy expiration time data. The first node identification data comprises the first node operator ID and the first node channel occupancy expiration time data comprises an absolute expiration time of the channel occupancy by the first node. The first node operator ID is compared with an operator ID of the further node and, when these are the same, it is determined that sharing of the channel with the first node is allowed. The absolute expiration time of the channel occupancy by the first node is compared with a proposed transmission expiration time of the further node and, when the proposed transmission will end before the absolute expiration time, it is determined that sharing of the channel with the first node is possible. The further node can then transmit on the channel until the chosen COT expiration time.

Thus an aggressive use of the transmission medium of the unlicensed spectrum among the nodes of the wireless communications network is achieved.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

The inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of enabling sharing of a transmission medium by a first node of a wireless communications network and a plurality of UEs of the wireless communications network, comprising:
 at the first node,
  generating first node identification data,
  generating medium sharing information comprising first node channel occupancy expiration time data,
  transmitting the first node identification data, and
  transmitting the medium sharing information using a dedicated broadcast signal, and
 at the plurality of UEs,
  receiving the first node identification data,
  receiving the medium sharing information, and
  using the information to determine how long a channel may be used.

2. The method according to claim 1, wherein the first node identification data comprises any of: a cell ID, and a Radio Network Temporary Identifier.

3. The method according to claim 1, wherein the medium sharing information comprises: a priority class to obtain a chosen Channel Occupancy Time (COT).

4. The method according to claim 1, wherein the first node is a UE.

5. The method according to claim 1, wherein the first node transmits multiple transmissions of the medium sharing information.

6. The method according to claim 1, wherein the first node is a base station.

* * * * *